Patented Aug. 30, 1949

Fig. 1
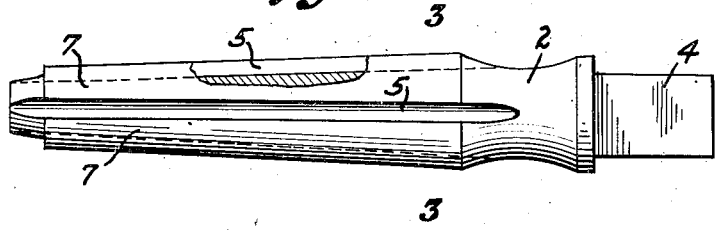 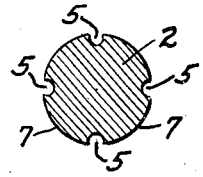
Fig. 2    Fig. 3
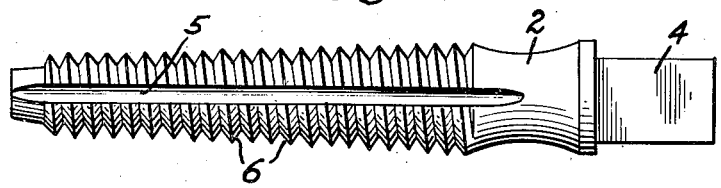
Fig. 4
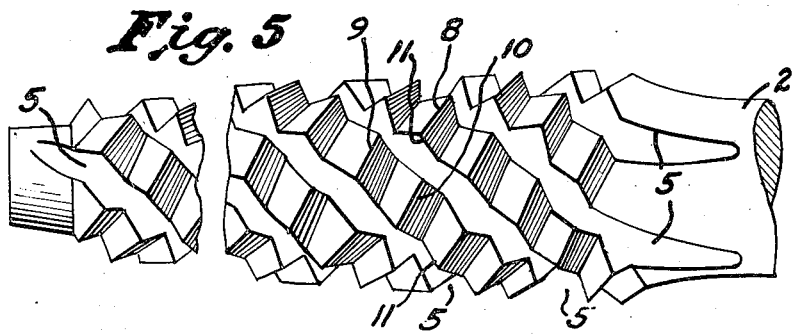
Fig. 5

2,480,648

UNITED STATES PATENT OFFICE 2,480,648

STUD EXTRACTOR AND METHOD OF MAKING THE SAME

Delmar C. Harer, Liberty, Pa.

Application November 3, 1947, Serial No. 783,740

7 Claims. (Cl. 81—71)

This invention relates to broken stud extractors, having for its object to provide such an article, and a method of manufacturing the same, which are more efficient than those heretofore proposed.

With these and other objects in view the invention resides in the novel details of construction and combinations of parts constituting the article, as well as in the novel steps and combinations of steps constituting the method of manufacture, as will be disclosed more fully hereinafter and particularly covered by the claims.

Referring to the accompanying drawings, forming a part of this specification, and in which like numerals represent like parts in all the views, Fig. 1 is a side elevational view of a blank from which the article is to be formed;

Fig. 2 is a similar view of the blank after the first step of operations in the manufacture of the article;

Fig. 3 is a transverse sectional view of the article illustrated in Fig. 2, said view taken as on the line 3—3 thereof and looking in the direction of the arrows;

Fig. 4 is a side elevational view of the blank after the second step of operations in the manufacture of the article; and Fig. 5 is a greatly enlarged foreshortened view in side elevation of the article after the final operation in its manufacture.

The article of this invention is for use in extracting a screw, bolt, stud and/or similar device, the head of which has become mutilated and/or broken off from the shank portion of the device so that the ordinary and usual tool is ineffective in the removal of the device from the work with which it is associated. In the past such extractors have been known in the trade as "easy-outs," but they have been formed by cutting left-hand threads upon the surface of the tapered blank, which left-hand threads require special (i. e. unusual and/or non-standard with respect to the equipment of a shop) dies or cutting tools, and such threads have been formed as extending continuously or unbroken around the extractor. In contradistinction to such prior practice, the article of this invention has standard right-hand threads cut thereon extending across longitudinal grooves formed in the surface of the blank, and then the threaded article is heated and subjected to a twisting action which transforms the right-hand threads to left-hand threads which are not only non-continuous by virtue of the grooves but which are staggered with respect to each other. The article of this invention is best described by the following operational steps of its manufacture.

A suitable blank identified generally in the drawings by the numeral 2 is turned to provide a tapered shank portion 3 and formed with a head 4 (square as indicated) for the reception of an actuating tool. A plurality of grooves 5 are then formed longitudinally of the blank, parallel to each other and disposed in axial planes of the blank, each groove being of a depth preferably equal to the depth of the threads to be cut on the blank. Right-hand threads 6 (U. S. standard) are then cut or otherwise formed upon the lands 7 created by the spaced grooves, the result being similar to an ordinary tap.

The threaded blank is then heated and twisted about its axis in a counter-clockwise direction. When twisted to the proper degree, the threads will be reversed to become left-handed, each thread such as 8 upon a land will be staggered in relation to the threads such as 9 and 10 upon an adjacent land, and each thread such as 8 will have a biting lip or edge 11. The twisted blank may then be finished by heat treatment (tempering).

In the use of this stud extractor, a hole is drilled axially of the broken stud, the extractor is then inserted in the drilled hole and turned in a counter-clockwise direction through the instrumentality of a tap wrench (or other suitable tool engaging the head 4 of the extractor) which results in the left-handed threads of the extractor biting into the broken stud and creating a threaded engagement between the extractor and the stud. This threaded engagement progresses and increases in degree with the turning of the extractor until the tapered portion of the extractor becomes larger than the diameter of the drilled hole, at which time the extractor becomes "locked" with the broken stud and further turning movement of the extractor results in an "unthreading" or removal of the stud with respect to the work with which the stud is associated. The grooves of the twisted extractor are instrumental in forming the biting lip for each thread section (land), and provide a clearance or space into which the material of the stud may expand or move during the cutting action of the threads. Said grooves may also be utilized to receive guiding members of the twisting mechanism, to insure the proper twist given to the blank in the formation of the extractor.

It is obvious that those skilled in the art may vary the details of construction and arrangements of parts constituting the article, as well as vary the steps and combinations of steps constituting the method of producing the article, without departing from the spirit of this invention, wherefore it is desired not to be limited to the exact foregoing disclosure except as may be required by the claims.

What is claimed is:

1. The method of forming a stud extractor from a tapered blank, comprising longitudinally grooving the surface of the blank to establish thread-receiving lands, forming right-hand threads on the lands created by the grooves, and twisting the threaded blank about its axis to cause the right-hand threads to become left-hand threads.

2. The method of forming a stud extractor from a tapered blank, comprising longitudinally grooving the surface of the blank to establish thread-receiving lands, forming right-hand threads on the lands created by the grooves, and twisting the threaded blank about its axis to cause the right-hand threads to become left-hand threads, the degree of twist being such that the left-hand threads of a land will be staggered with respect to the left-hand threads of an adjacent land.

3. A stud extractor comprising a tapered shank, a plurality of grooves disposed helically in said shank to provide thread-receiving lands, and threads formed in said lands, the threads of a land staggered with respect to the threads of an adjacent land whereby said threads are out of continuous helical registration.

4. A stud extractor comprising a tapered shank, a plurality of grooves disposed helically in said shank to provide thread-receiving lands, and left-hand threads formed in said lands, the threads of a land staggered with respect to the threads of an adjacent land whereby said threads are out of continuous helical registration.

5. A stud extractor comprising a tapered shank, a plurality of grooves disposed helically in said shank to provide thread-receiving lands, and left-hand threads formed in said lands, the depth of a groove being approximately equal to the depth of the threads.

6. A stud extractor comprising a tapered shank, a plurality of grooves disposed helically in said shank to provide thread-receiving lands, and left-hand threads formed in said lands, the threads of a land staggered with respect to the threads of an adjacent land whereby said threads are out of continuous helical registration, the depth of a groove being approximately equal to the depth of the threads.

7. The method of forming a stud extractor from a tapered blank, comprising longitudinally grooving the surface of the blank at spaced intervals to establish thread-receiving lands, forming threads on the lands created by the grooves, the threads of a land having helical registration with the threads of an adjacent land, and twisting the threaded blank about its axis to bring the threads of a land out of helical registration with the threads of an adjacent land.

DELMAR C. HARER.

REFERENCES CITED

The following references are of record in the file of this patent:

UNITED STATES PATENTS

| Number | Name | Date |
|---|---|---|
| 1,844,241 | Bryant | Feb. 9, 1932 |